Feb. 1, 1927. 1,615,934
J. M. CROWE
RIVET CUTTING GUN VALVE
Filed Feb. 13, 1925
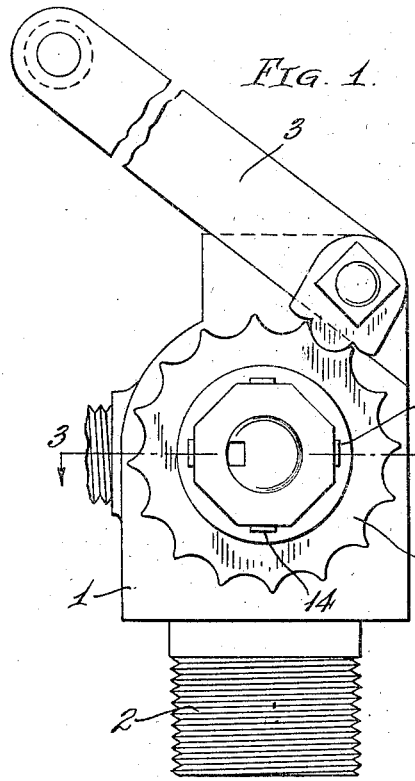
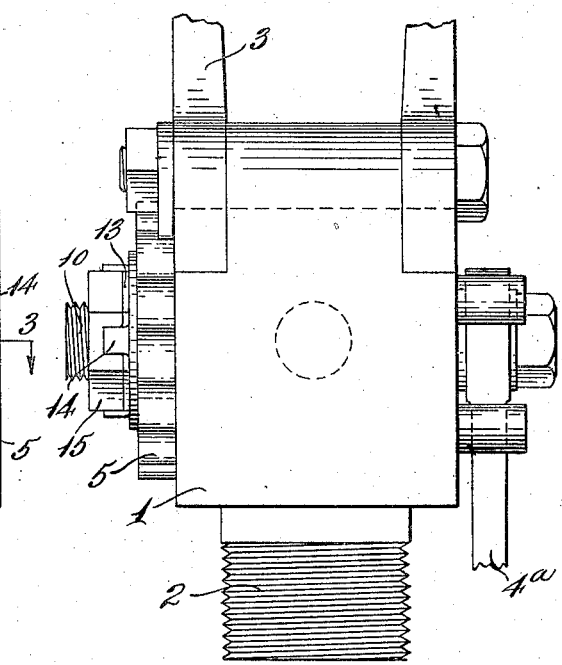
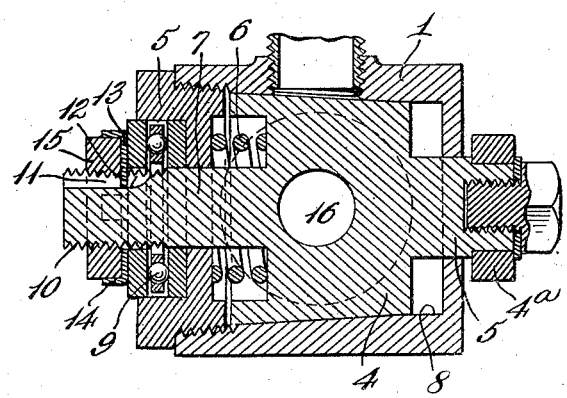
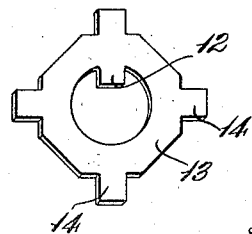
Inventor
John M. Crowe
By Brockett, Hyde & Milburn
Attorneys Patented Feb. 1, 1927.

1,615,934

UNITED STATES PATENT OFFICE.

JOHN M. CROWE, OF COVINGTON, KENTUCKY.

RIVET-CUTTING-GUN VALVE.

Application filed February 13, 1925. Serial No. 3,920.

The present invention relates to improvements in the same general type of valve structure as shown in my own Patent No. 1,446,547 of February 27th, 1923, to which reference may be had for a fuller understanding of the manner of operation and use of the present valve structure. Reference may be had also to my co-pending application No. 636,490 for a fuller understanding of certain details illustrated in connection with the present disclosure.

The objects of the present invention are to provide a valve structure of the type just referred to in which provision is made for insuring what might be termed an effective or corrective re-seating of the valve in the valve casing which might be made necessary by wear between the parts; to provide also a ball bearing for the valve, thereby facilitating the operation of the same; and to provide also an improved means of locking the several parts of the valve structure in assembly so as to prevent accidental loosening or separation of the same.

Fig. 1 is an elevation of my improved device; Fig. 2 is an elevation at 90° to Fig. 1; Fig. 3 is a sectional view taken on line 3—3, Fig. 2; and Fig. 4 is a detail view of the locking member.

The valve casing 1 is provided with the screw threaded neck 2 which is adapted for attachment to the one end of the barrel of a pneumatic tool in the manner illustrated in the patent above referred to. The entire structure is adapted to be carried about and held by the operator by means of the handle 3 which is attached to the other side of the valve casing, as more fully and clearly set forth in the pending application above referred to. The valve 4, which is of tapered form and which is adapted for interengagement with the correspondingly tapered wall of the casing 1, is adapted for adjustment or operation by means of handle 4ª which is secured to the restricted end portion 18 of the valve which extends out through the casing 1. This will also be readily understood from the patent and pending application above referred to. The other end of the casing 1 is open and is adapted to be closed by means of the cap 5 having screw threaded engagement with the casing. The coil spring 6 surrounds the restricted end portion 7 of the valve and extends between the cap 5 and the valve 4 so as to maintain the valve in effective seating engagement with the valve casing. It will be observed that the smaller end of the tapered portion of valve is spaced from the corresponding end of the casing and it is here pointed out that the remaining portion of the inner wall of the casing, that is beyond the smaller end of the valve and as indicated by reference numeral 8, is substantially straight instead of being tapered. The purpose of this straight portion is to permit the valve to automatically reseat itself as may be necessary because of wear between the valve and the casing wall. In other words, with this structure the valve under the influence of the spring 6 may without obstruction or hindrance have automatic movement or adjustment in a direction toward the right, as viewed in Fig. 3 of the drawings, so as to at all times preserve a snug, close interengagement with the inner wall of the casing. Such corrective positioning of the valve would not be possible if the portion 8 were continued as a taper of the same degree as that portion which affords a seat for the valve.

The outside of the cap 5 is recessed so as to afford a seat for the ball bearing unit indicated by reference numeral 9, this unit surrounding the restricted portion 7 of the valve. As clearly indicated in the drawing, the outer end portion of the restricted extension 7 is screw threaded, as indicated at 10, and is provided with a keyway 11 which is adapted to receive the key 12 of the lock member 13. This lock member is provided with a number (four being here shown) of fingers 14 which are upon assembly of the parts, adapted to be bent down at right angles to the main body of the lock member 13 so as to engage the sides of the nut 15 for securing the same against accidental loosening.

In operation of the present valve, whose port is indicated by reference numeral 16, the same will be adjusted to the desired position by means of the handle 4ª, and if necessary the same may be relieved somewhat by movement toward the left, as viewed in Fig. 3, against the tension of spring 6 so as to facilitate the rotary movement of the valve. As above explained, any wear which might occur between the valve and its seat will be automatically taken up by the valve being forced toward the right by the spring 6, as viewed in Fig. 3. The straight portion 8, because of its particular form, permits such movement and thereby insures at all times snug seating engagement of the valve in the casing. Furthermore, the ease with which the valve is adjusted in the manner just now referred to is considerably increased by virtue of the ball bearing which together with the other several parts are maintained in assembly by means of the lock already described without danger of accidental loosening or disconnection.

What I claim is:

A valve structure, comprising a casing open at one end and having an opening through its other end, a valve in said casing and having portions extending through the ends of said casing, a cap for otherwise closing the open end of said casing, a ball bearing seated on the outside of said cap and surrounding the extending end portion of said valve, and means on the said extending end portion for securely locking said ball bearing in position.

In testimony whereof I hereby affix my signature.

JOHN M. CROWE.